United States Patent [19]
Heider et al.

[11] Patent Number: 5,308,100
[45] Date of Patent: May 3, 1994

[54] TRAILER COUPLER ASSEMBLY

[76] Inventors: Merle J. Heider, 203-12th St. SW.;
Dale J. Heider, 1108 8th Ave. SW.;
Leon J. Heider, 1107 Third Ave.
SW.; Craig J. Heider, 812 S. Taft St.,
all of Humboldt, Iowa 50548

[21] Appl. No.: 961,614

[22] Filed: Oct. 15, 1992

[51] Int. Cl.$^5$ .............................................. B60D 1/36
[52] U.S. Cl. ............................ 280/474; 280/478.1;
280/491.1; 403/102
[58] Field of Search .............. 280/462, 461.1, 478.1,
280/474, 477, 479.3, 488, 491.1, 491.3, 491.4,
492, 493, 498, 499, 507, 514; 403/83, 101, 102

[56] References Cited

U.S. PATENT DOCUMENTS

| | | | |
|---|---|---|---|
| 4,109,930 | 8/1978 | Pilhall | 280/491.4 |
| 4,116,460 | 9/1978 | Drower | 280/478.1 |
| 5,000,473 | 3/1991 | Johnson | 280/491.1 |

FOREIGN PATENT DOCUMENTS

| | | | |
|---|---|---|---|
| 0916861 | 8/1954 | Fed. Rep. of Germany | 280/477 |
| 2196917 | 5/1988 | United Kingdom | 280/478.1 |

Primary Examiner—Margaret A. Focarino
Assistant Examiner—A. Boehler
Attorney, Agent, or Firm—Zarley, McKee, Thomte, Voorhees & Sease

[57] ABSTRACT

A coupling device for coupling a trailer to a vehicle includes a first channel adapted to be connected to the tongue of the trailer and a second channel adapted to be connected to a hitch member. The hitch member is adapted to be connected to the hitch of a vehicle. The first and second channels are joined together by a pair of links which are pivoted about two spaced apart vertical axes. The hitch member can swing about the links so as to permit alignment of the hitch member with the hitch on the vehicle.

6 Claims, 2 Drawing Sheets

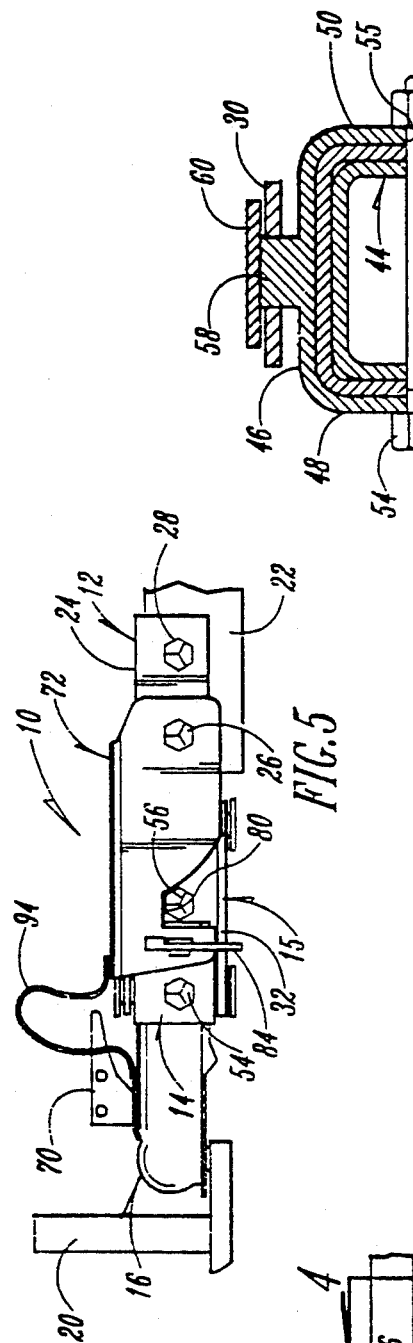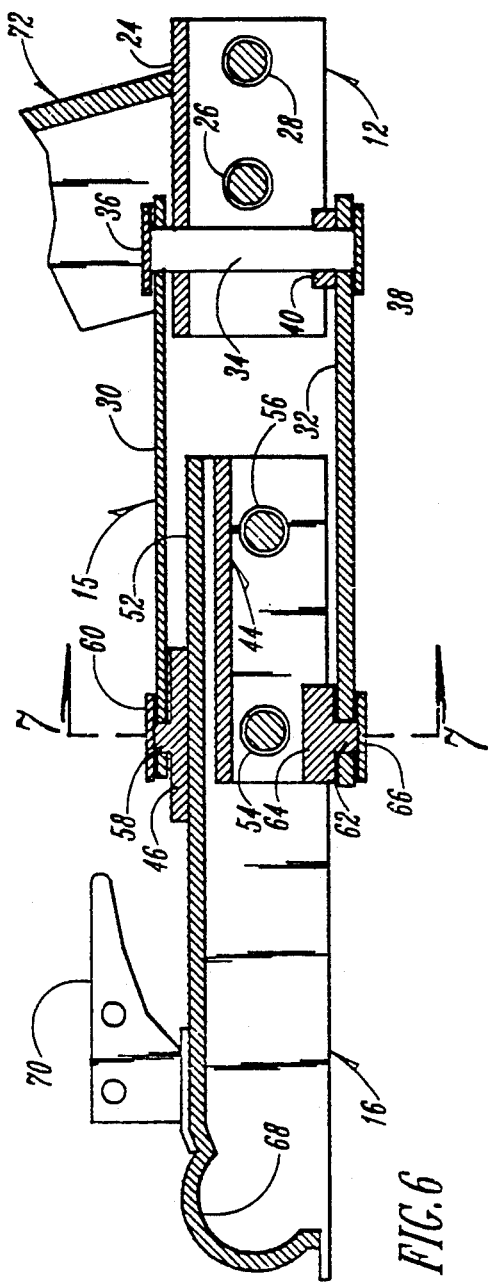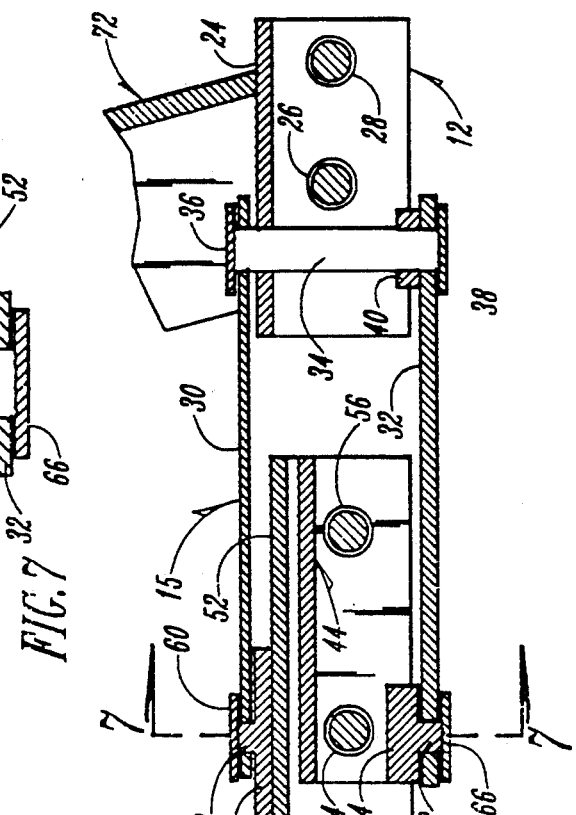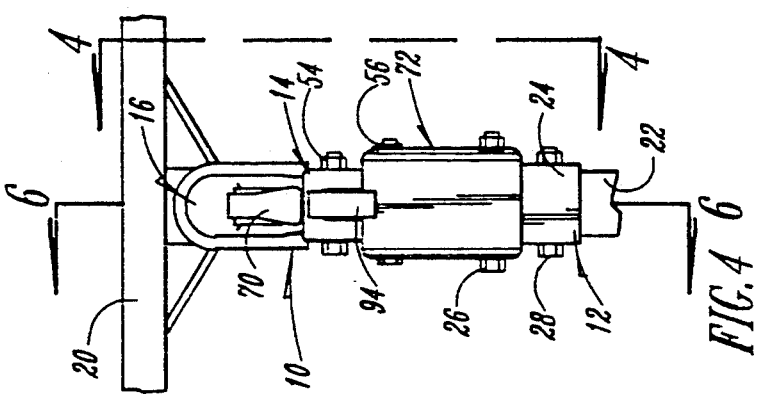

TRAILER COUPLER ASSEMBLY

BACKGROUND OF THE INVENTION

This invention relates to a trailer coupler assembly.

One problem often encountered when trying to hitch a vehicle to a trailer is the proper alignment of the hitch on the vehicle with the hitch on the tongue of the trailer. This problem is particularly difficult in a situation where the trailer is not easily movable. Under those circumstances, the vehicle must be carefully aligned with the hitch on the trailer tongue, and this is often a long and time consuming process.

Therefore a primary object of the present invention is the provision of an improved trailer coupler assembly.

A further object of the present invention is the provision of an improved trailer coupler assembly which permits the hitch on the trailer and the hitch on the vehicle to be quickly and easily aligned without the necessity of moving the vehicle or the trailer.

A further object of the present invention is the provision of an improved trailer coupler assembly which permits the hitch to be mounted to the trailer in a movable manner so that the hitch can be moved both to the left and to the right and forward and backward in order to properly align with the hitch on the pulling vehicle.

A further object of the present invention is the provision of a device which can be easily adapted to hitch assemblies presently being used.

A further object of the present invention is the provision of an improved coupler assembly which is economical to manufacture, durable in use, and efficient in operation.

SUMMARY OF THE INVENTION

The foregoing objects can be achieved by a trailer coupler assembly which includes a first channel member adapted to be rigidly mounted to the tongue of the trailer. A second channel assembly is adapted to be rigidly mounted to the hitch socket. A pair of links are pivotally connected at their opposite ends to each of the two channels so that the two channels can be pivoted forwardly, rearwardly, to the left, and to the right of the tongue of the vehicle.

The second channel member is adapted to be connected to hitch assemblies of varying types, and will easily accommodate numerous types of hitches.

Assembly of the present device is simple. An existing hitch socket (or other hitching device) is taken off of the tongue of the trailer and is bolted to the second channel of the coupling assembly. The first channel of the coupling assembly is bolted to the tongue of the trailer.

Then the pulling vehicle is backed up to the tongue of the trailer. In prior devices, if the vehicle was misaligned with the tongue of the trailer, the operator would be required to pull forward and make a second try at realigning. This process would continue until proper alignment was achieved.

With the present invention, even if the hitch on the vehicle is misaligned by several inches, all that is required is to fold the hitch of the coupler assembly forwardly, rearwardly, to the left, or to the right as required until proper alignment is achieved. The hitch on the coupler assembly is then attached to the hitch on the vehicle.

Next the vehicle pulls forwardly and the linkage straightens out in response to the tension from the vehicle.

A U-shaped cover is pivotally mounted above the linkage, and is normally out of engagement with the linkage. However, when the vehicle pulls the linkage into a straightened position, a small rubber strap pulls the hood assembly downwardly over the linkage. The hood assembly is U-shaped in cross-section and includes two side legs which embrace the opposite sides of the linkage so as to prevent the linkage from further pivotal movement.

The present coupling assembly can be made to any length so as to provide varying amounts of ranges of movement. Furthermore, it is easily adaptable to any type of trailer or wagon such as utility trailers, livestock trailers, rental trailers, and farm wagons. The coupler can also be easily used with hitches of various configurations.

BRIEF DESCRIPTION OF THE DRAWINGS

FIG. 4 is a top plan view of the coupler assembly in its straight line position.

FIG. 5 is an elevational view taken along line 4—4 of FIG. 4.

FIG. 6 is a longitudinal sectional view taken along line 6—6 of FIG. 4.

FIG. 7 is a sectional view taken along line 7—7 of FIG. 6.

DESCRIPTION OF THE PREFERRED EMBODIMENT

Figure 1:
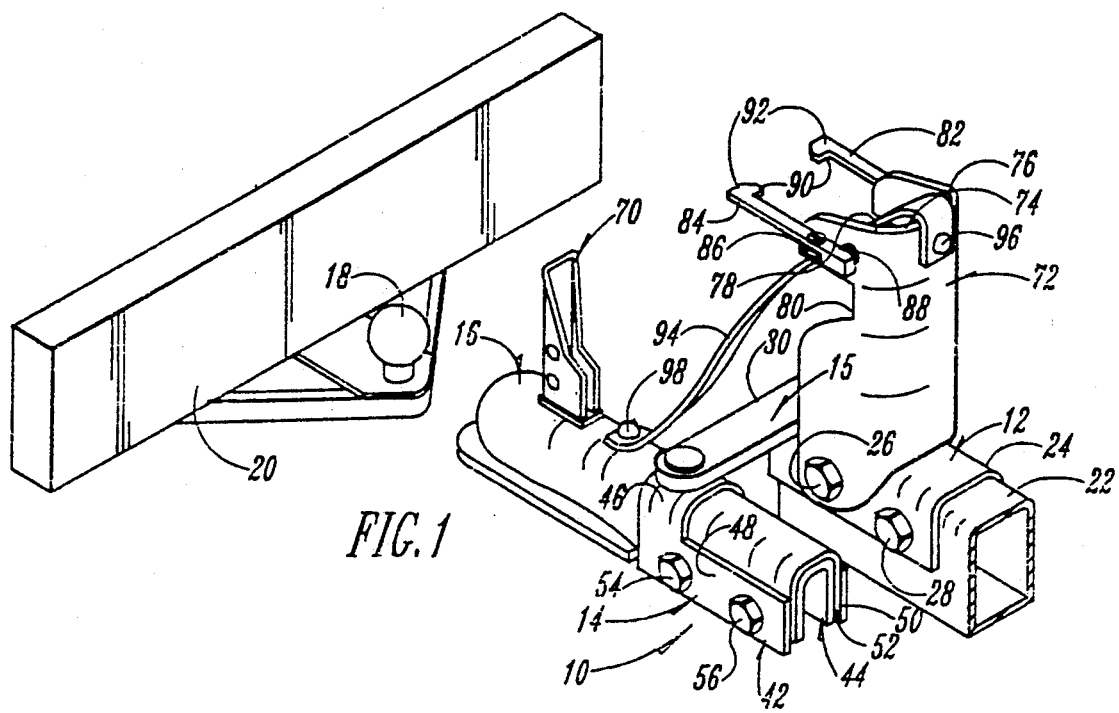
FIG. 1 is a perspective view of the coupler assembly of the present invention in use with a hitch on a vehicle.

Referring to the drawings, the numeral 10 generally designates the coupling assembly of the present invention. Coupling assembly 10 includes a first channel assembly 12, a second channel assembly 14, and a linkage assembly 15 interconnecting the two. A hinge socket assembly 16 is shown attached to second channel assembly 14, and hitch socket assembly 16 is adapted to be attached to the hitch ball 18 on a pulling vehicle 20.

First channel assembly 12 is comprised of a U-shaped channel 24 which fits over the square tube configuration of a trailer tongue 22. First and second bolts 26, 28 extend through the U-shaped channel 24 and also through the square tube of trailer tongue 22 so as to rigidly secure the first channel assembly 12 to the tongue 22.

Linkage assembly 15 is comprised of an upper link 30 and a lower link 32 which are pivotally mounted to the first channel assembly 12 by means of a pivot pin 34 (FIG. 6). Pin 34 includes an upper head 36 welded to its upper end and a lower head 38 attached to its lower end so as to attach the links 30, 32 to the U-shaped channel 24. A transverse block 40 is welded between the two opposite U-shaped legs of U-shaped channel 24 and is also welded to the pivot pin 34 so as to provide reinforcement thereto.

Attached to the front end of linkage assembly 15 are an outer U-shaped channel 42 and an inner U-shaped channel 44. Channel 42 comprises an arch 46 interconnected by two opposite legs 48, 50. Extending upwardly from arch 46 is an upper stud 58 having a head 60 welded thereto. Stud 58 extends through upper link 30 so as to provide a pivotal mounting for upper link 30.

Hitch socket assembly 16 includes a U-shaped channel 52 at its rear end having a pair of horizontal bolt holes 53 extending therethrough. Channel 52 is slidably fitted between the inner channel 44 and the outer channel 42 as shown in FIGS. 6 and 7. Outer channel 42 is provided with horizontal bolt holes 55, and inner channel 44 is provided with horizontal bolt holes 57. Bolt holes 53, 55, and 57 are aligned with one another, and horizontal bolts 54, 56 extend therethrough so as to secure the outer channel 42, the inner channel 44, and the hitch channel 52 together.

Welded to and extending between the lower ends of the two U-shaped legs of inner channel 44 is an elongated lower block 64 having a lower stud 62 welded thereto and extending downwardly therefrom. Stud 62 extends through lower link 32 and is pivotally attached thereto by means of a lower head 66. Thus, studs 58, 62 provide a vertical axis for the pivotal movement of the front ends of links 30, 32.

Hitch socket assembly 66 also includes a conventional hitch socket 68 and a locking lever 70 for securing the hitch socket to the ball 18 on the vehicle 20.

A cover lock 72 is pivotally mounted over the bolt 26 of first channel assembly 12 for pivotal movement about a horizontal axis. Cover lock 72 includes in cross-section a web 74, and two spaced apart legs 76, 78. Legs 76, 78 are each provided with notches 80 which are adapted to receive the bolt heads of bolts 54 when the cover lock is in its lower most position as shown in FIG. 5. The cover lock 72 is adapted to pivot from its upper most position shown in FIGS. 1 and 3 to its lower most position shown in FIGS. 4 and 5. In the lower most position of cover lock 72, the legs 76, 78 of cover lock 72 embrace the sides of second channel assembly 14 and also embrace the sides of the links 30, 32 so as to hold the first channel assembly 12, the second channel assembly 14, the linkage assembly 15, and the hitch socket assembly 16 in a straight line as shown in FIG. 4.

Mounted to the outside of the legs 76, 78 of cover lock 72 are a pair of latching arms 82, 84 which are pivotally mounted to the legs 76, 78 by a pivot hinge 86. A compression spring 88 yieldably urges the lower ends of latching arms 82, 84 toward one another. The lower ends of latching arms 82, 84 are each provided with an inwardly extending pawl having a cam edge 92 on its lower surface. When the cover lock 72 pivots from its upper most position to its lower most position, the cam edges 92 of the latching arms 82, 84 cam outwardly as they engage the outer surface of second channel assembly 14. However, when the pawls 90 pass below the lower edges of channel assembly 14, the springs 88 cause the pawls to spring inwardly so that they retentively engage the lower edges of second channel assembly 14. This holds the cover lock in its locked position during transporting of the trailer.

A spring strap 94 is attached by an upper anchor 96 to cover lock 72 and attached at its lower end by a lower anchor 98 to the hitch assembly 16. The tension in spring 94 is such that when the first channel assembly 12 and the second channel assembly 14 are in linear alignment, the spring is under tension so as to pull the cover lock downwardly to its lower most position. This permits the cover lock to automatically move to its lower most position when the vehicle is pulling the trailer.

In operation, the hitch socket assembly 16 is removed from the trailer tongue 22. The hitch socket assembly 16 then is mounted to the second channel assembly 14 in the manner described above. Next, the first channel assembly 12 is bolted to the trailer tongue 22 by bolts 26, 28.

Figure 2:
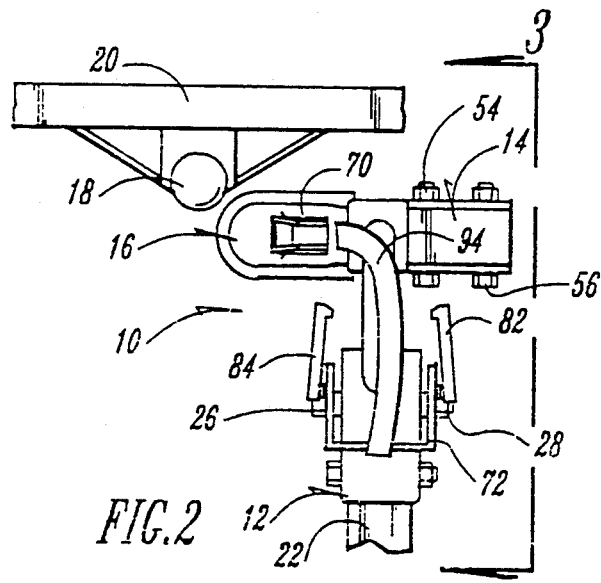
FIG. 2 is a top plan view of the coupling assembly of FIG. 1, but showing the linkage of the coupler in a different position.
Figure 3:
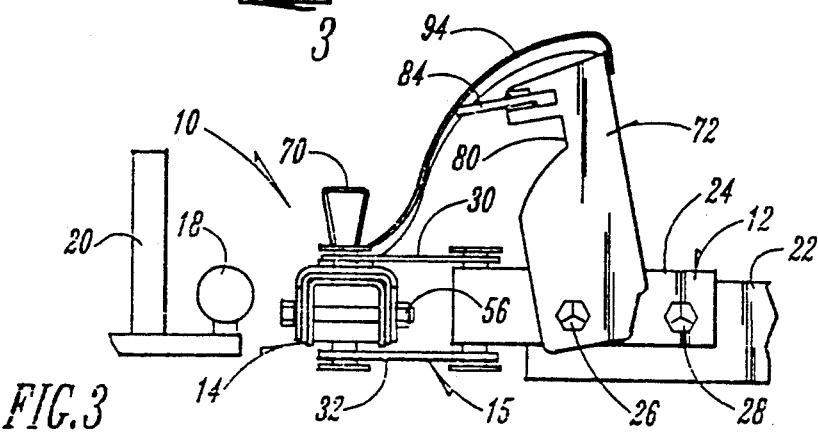
FIG. 3 is a side elevational view taken along line 3—3 of FIG. 2.

The connecting of the vehicle 20 to the trailer is accomplished by backing the vehicle to a position where the hitch ball 18 is in close proximity to the hitch socket assembly 16. However, it is not essential that there be perfect alignment between the hitch ball 18 and the hitch socket assembly 16. The hitch socket assembly 16 can be moved into proper position with respect to the hitch ball 18 merely by pivoting the second channel assembly 14 about the linkage assembly 15 until the hitch socket assembly 16 can be fitted over the hitch ball 18. An example of how this can be achieved is shown in FIGS. 1, 2, and 3. Once the hitch socket assembly is fitted over the ball 18, it is only necessary for the operator to pull the vehicle 20 forward so as to cause the first channel 12, the second channel assembly 14, and the linkage assembly 15 to move into linear alignment. At this point, the spring strap 94 causes the cover lock 72 to fall to its lower most position shown in FIGS. 4 and 5 so as to lock the first channel assembly 12, the second channel assembly 14, and the linkage assembly 15 in their linearly aligned positions.

The preferred embodiment of the invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit or scope of the invention as further defined in the following claims.

We claim:

1. A coupling device for coupling a vehicle to a trailer, said vehicle having a first hitch member attached thereto and said trailer having an elongated trailer tongue attached thereto, said trailer tongue having a longitudinal axis, said coupling device comprising:
    a first elongated channel having a longitudinal axis;
    first securing means for rigidly attaching said first channel to said trailer tongue;
    a second hitch member adapted to be detachably secured to said first hitch member on said vehicle;
    a second elongated channel having a longitudinal axis and being rigidly connected to said second hitch member;
    an elongated linkage mechanism having a longitudinal axis and having first and second opposite ends;
    first pivot means pivotally connecting said first end of said linkage mechanism to said first elongated channel for pivotal movement about a first vertical axis;
    second pivot means pivotally connecting said second end of said linkage mechanism to said second elongated channel for pivotal movement about a second vertical axis;
    said first channel, said linkage mechanism, and said second channel being pivotal about said first and second vertical axis to a plurality of positions, one of which is an extended position wherein said longitudinal axis of said first channel, said second channel and said linkage mechanism are all in end to end alignment;

a lock member having spaced part legs and being pivotally connected to one of said first and second channels for pivotal movement about a horizontal lock axis form an unlocked position to a locked position when said first channel, said second channel and said linkage mechanism are in said extended position whereby said spaced apart legs engage said first channel, said second channel, and said linkage mechanism to hold them in said extended position.

2. A coupling device according to claim 1 wherein said linkage mechanism comprises at least one elongated link.

3. A coupling device according to claim 1 wherein said linkage mechanism comprises a second elongated link.

4. A coupling device of claim 1 wherein latching means are provided on said lock member for retentively detachably engaging the other of said first and second channels to hold said lock member in said locked position.

5. A coupling device of claim 4 wherein said latching means comprise a pair of latching arms pivotally connected to said lock member for pivotal movement between a latched position retentively engaging said other channel and an unlatched position, latch spring means yieldably urging said latching arms toward said latched position.

6. A coupling device of claim 1 wherein lock spring means yieldably urge said lock member to said locked position when said first channel, said second channel, and said linkage mechanism are in said extended position.

* * * * *